US008761084B2

(12) United States Patent
Pandey et al.

(10) Patent No.: US 8,761,084 B2
(45) Date of Patent: Jun. 24, 2014

(54) APPARATUS AND METHOD FOR ESTABLISHING DATA COMMUNICATION IN A TIME-SYNCHRONIZED MESH WIRELESS NETWORK DURING TIME SYNCHRONIZATION FAILURES

(75) Inventors: Raju Pandey, Davis, CA (US); Seokman Paul Han, Rancho Cordova, CA (US); Rituparna Ghosh, Folsom, CA (US)

(73) Assignee: SynapSense Corporation, Folsom, CA (US)

( * ) Notice: Subject to any disclaimer, the term of this patent is extended or adjusted under 35 U.S.C. 154(b) by 1004 days.

(21) Appl. No.: 12/321,118

(22) Filed: Jan. 14, 2009

(65) Prior Publication Data

US 2010/0177708 A1   Jul. 15, 2010

(51) Int. Cl.
*H04Q 7/00* (2006.01)
*H04W 74/08* (2009.01)

(52) U.S. Cl.
CPC .................................. *H04W 74/0883* (2013.01)
USPC ........................................... 370/328; 370/338

(58) Field of Classification Search
CPC ................................................ H04W 77/0883
USPC ................................................. 370/328, 338
See application file for complete search history.

(56) References Cited

U.S. PATENT DOCUMENTS

| | | |
|---|---|---|
| 5,515,369 A | 5/1996 | Flammer, III |
| 5,896,412 A | 4/1999 | Levanon |
| 6,208,247 B1 | 3/2001 | Agre |
| 6,480,497 B1 | 11/2002 | Flammer, III |
| 6,590,928 B1 | 7/2003 | Haartsen |
| 6,735,630 B1 | 5/2004 | Gelvin |
| 6,850,502 B1 | 2/2005 | Kagan |
| 6,859,831 B1 | 2/2005 | Gelvin |
| 7,010,392 B2 | 3/2006 | Bash |
| 7,020,701 B1 | 3/2006 | Gelvin |
| 7,031,870 B2 | 4/2006 | Sharma |
| 7,176,808 B1 | 2/2007 | Broad |
| 7,180,915 B2 | 2/2007 | Beyer |
| 7,272,129 B2 | 9/2007 | Calcev |
| 7,570,975 B2 * | 8/2009 | Oprescu-Surcobe et al. 455/574 |
| 2002/0111161 A1 * | 8/2002 | Bourlas et al. ................ 455/423 |
| 2005/0024826 A1 | 2/2005 | Bash |
| 2005/0173549 A1 | 8/2005 | Bash |
| 2005/0213612 A1 | 9/2005 | Pister |
| 2006/0029060 A1 | 2/2006 | Pister |

(Continued)

OTHER PUBLICATIONS

C. Frank et al., Proceedings of the 3rd International Conference on Embedded Networked Sensor Systems, pp. 230-242, Feb. 2004, Nov. 2005.

(Continued)

*Primary Examiner* — Wanda Z Russell
(74) *Attorney, Agent, or Firm* — Inventive Patent Law P.C.; Jim H. Salter

(57) ABSTRACT

Various embodiments provide an apparatus and method for establishing data communication in a time-synchronized mesh wireless network during time synchronization failures. An example embodiment includes experiencing circumstances adversely affecting synchronization of data communications between wireless network nodes; transitioning to an alert mode wherein a radio of a wireless network node is activated for a longer period of time relative to a normal operating mode; sending a message to at least one neighbor node; listening for a response from the neighbor node; and establishing data communications with the neighbor node upon receiving the response.

27 Claims, 7 Drawing Sheets

(56) References Cited

U.S. PATENT DOCUMENTS

| | | |
|---|---|---|
| 2006/0029061 A1 | 2/2006 | Pister |
| 2006/0161909 A1 | 7/2006 | Pandey |
| 2006/0268791 A1* | 11/2006 | Cheng et al. ............... 370/338 |
| 2007/0051808 A1* | 3/2007 | Adams et al. ............... 235/451 |
| 2007/0258508 A1 | 11/2007 | Werb |
| 2008/0256166 A1* | 10/2008 | Branson et al. ............. 709/201 |
| 2009/0059843 A1* | 3/2009 | Binding et al. ............. 370/328 |
| 2009/0240449 A1* | 9/2009 | Gibala et al. ............... 702/62 |
| 2010/0260056 A1* | 10/2010 | Takai et al. ................ 370/252 |

OTHER PUBLICATIONS

Kanzaki, Akimitsu et al.; Dynamic TDMA Slot Assignments in Ad Hoc Networks; 17th Int'l Conference on Advanced Information Networking and Applications; Mar. 2003; pp. 330-335.

Lee, Myung J. et al.; Emerging Standards for Wireless Mesh Technology; IEEE Wireless Communications; Apr. 2006; vol. 13; pp. 56-63.

Wei Li et al.; Dynamic TDMA Slot Assignment Protocol for Multihop Ad Hoc Networks; Int'l Conference on Communication Technology; Nov. 2006; pp. 1-4.

* cited by examiner

APPARATUS AND METHOD FOR ESTABLISHING DATA COMMUNICATION IN A TIME-SYNCHRONIZED MESH WIRELESS NETWORK DURING TIME SYNCHRONIZATION FAILURES

CROSS-REFERENCE TO RELATED PATENT APPLICATION

This non-provisional patent application is related to the U.S. patent application Ser. No. 12/287,093, filed Oct. 3, 2008, entitled, "APPARATUS AND METHOD FOR MANAGING PACKET ROUTING THROUGH INTERNALLY-POWERED NETWORK DEVICES IN WIRELESS SENSOR NETWORKS", and assigned to the same assignee as the present patent application.

TECHNICAL FIELD

The disclosed subject matter relates to the field of network communications, and more particularly to network routing and power management in mesh networks.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright 2007-2009 SynapSense Corporation, All Rights Reserved.

BACKGROUND

Mesh networking is a way to route data and instructions between nodes. A node can be any device connected to a computer network. Nodes can be computers, routers, or various other networked devices. On a TCP/IP network, a node is any device with an Internet Protocol (IP) address. Mesh networking allows for continuous connections and reconfiguration around broken or blocked paths by "hopping" from node to node until the destination is reached. Mesh networks differ from other networks in that the component parts can all connect to each other via multiple hops, and they generally are not mobile devices. In a packet-switching network, a hop is the trip a data packet takes from one router or intermediate node in a network to another node in the network. On the Internet (or a network that uses TCP/IP), the number of hops a packet has taken toward its destination (called the "hop count") is kept in the packet header.

Wireless mesh networks employ intelligent nodes typically including a wireless (e.g., radio) transmitter and receiver, a power source, input devices, sometimes output devices, and an intelligent controller, such as a programmable microprocessor controller with memory. In the past, wireless mesh networks have been developed having configurations or networks for communication that are static, dynamic or a hybrid of static and dynamic. Power for these networks has been supplied either via wires (i.e., the nodes are "plugged in" or externally powered) or from batteries in each node (i.e., the nodes are internally powered). Networks that employ a combination of externally powered nodes and internally powered nodes can be denoted hybrid networks. As the size, power, and cost of the computation and communication requirements of these devices have decreased over time, battery-powered wireless nodes have gotten smaller; yet, the computing demands on the wireless nodes have increased.

Wireless mesh network technology can be used for deploying sensors as nodes in a variety of different environments for monitoring diverse parameters such as, for example, temperature, pressure, particle counts, and humidity. These types of networks can be denoted wireless sensor networks (WSN). Each sensor in a WSN is typically powered by a battery and therefore has a limited energy supply and operational capability. Because the sensors are constantly monitoring the environment and communicating with other nodes, it is important to efficiently manage the power consumed by each sensing device. Further, it is important to monitor the operational status of each of the sensing devices.

Given that many WSN devices are internally-powered (e.g., battery), the overall network lifetime depends on the efficiency with which sensing, computing, and data transmission by the sensors can be achieved. Because the power requirements for wireless communication by the sensors are orders of magnitude higher than the other sensor operations, it is critical that operation of the radios on these devices be managed carefully. This is primarily achieved by turning the radio on (activating the radio) only when devices need to send and/or receive data. The operational lifetime of the network, thus, depends on the ability to effectively manage the operation of the radios in the wireless network nodes.

The network devices in a WSN must efficiently manage the network topology so that network packets are properly routed to their destination. In order to carry out this task, the WSN network devices must wake up periodically, activate their radios, and listen for a data communication from another network device to determine if any data packet needs to be routed. Most of the battery power in a wireless network device is consumed when the device must wake up more often, turn the radio on, and listen for a data communication from another network device. Thus, the process of data path maintenance and packet routing through wireless devices in a WSN needs to be highly efficient in order to extend the operational lifetime of the network.

Several wireless sensor network solutions depend on a global time synchronization scheme to schedule routing of packets among wireless devices over multiple hops. In these networks, devices have a common notion of a global time, which they use for determining their wake up and sleep schedules. Two network devices communicate by waking up at the same global time, communicating messages to each other, and then turning the radio off (de-activating the radio). This mode of synchronization, often called the low power listening (LPL) mode, allows devices to aggressively conserve their battery power by turning their radio off for the majority of the time.

Network devices manage the notion of global time by mapping a local time reading from the network device resident hardware clocks to a reference global time value. The network devices can receive the reference global time value in several ways: for instance, 1) network devices can receive the reference global time value from other network devices in the network using the wireless network, 2) network devices can directly access a global time from Internet sources, or 3) network devices can use global positioning satellite (GPS) time sources. The hardware clocks in the wireless network devices usually have a drift that causes the local clock readings to deviate away from the global time value. Over time, this deviation can be significant. The hardware clock drifts, therefore, can cause the mapping from a local clock value to a network device's notion of global time value to deviate significantly from the actual global time. Network devices may use some form of drift correction algorithms (for instance, a linear regression algorithm) to predict the possible deviations and correct the mapping between local and global times. This allows a network device's computed global time values to be within a small deviation from the actual global time value.

Nevertheless, network devices in a time-synchronized mesh wireless network may lose time synchronization for several reasons. An example is the case when the network devices (and/or the hardware clock) experience rapid changes in the environmental or other conditions in which they are operating (e.g., temperature). Such rapid changes can result in very large local time drifts. Unfortunately, many drift correction algorithms cannot account for non-linear and very large clock drifts. The calculated global time value, thus, can deviate significantly from the actual global time value. This time deviation can cause the networked devices to lose time synchronization with each other. A network device may also lose time synchronization for a variety of other reasons, such as clock failures, power failures, glitches, or spikes, network device memory failures, data communication failures, radio interference, software/firmware errors, or any other circumstance, condition, or event adversely affecting, potentially causing, or causing a loss of time synchronization between network devices in a time-synchronized mesh wireless network.

A network device's loss of time synchronization with its neighboring nodes means that the network devices may not wake up at the same global time, thereby losing the ability to transmit/receive data through the mesh network. In a particular embodiment of a wireless sensor network, this inability to send sensor data between nodes of the network may be fatal to a data network and devastating to a monitored location, if the monitored location is experiencing rapid environmental changes. For instance, consider the case where wireless network sensors are deployed in a data center. Due to a loss of one or more air conditioning or air handling units, the temperature in the data center may rise very quickly. In this circumstance, the wireless network sensors need to be able to monitor the rise in temperature, and inform the data center operator of the circumstance. If the monitoring wireless network sensors lose time synchronization for any reason at this critical time, the wireless network sensors will not be able to communicate the critical environmental data to the operator, which may result in damage to the data center computing equipment.

U.S. Pat. No. 5,515,369 describes a technology for use in a wireless packet communication system having a plurality of nodes, each having a transmitter and a receiver, the receiver at each node is assigned a seed value and is provided with a channel punchout mask. A node uses its seed value and punchout mask to generate a specific randomly ordered channel hopping band plan on which to receive signals. A node transmits its seed value and punchout mask to target nodes with which it wants to establish communication links, and those target nodes each use the seed value and punchout mask to generate the randomly ordered channel hopping band plan for that node. Subsequently, when one of the target nodes wishes to transmit to the node, the target node changes frequency to the frequency of the node according to that node's band plan.

U.S. Pat. No. 6,590,928 describes a wireless network including master and slave units. The master sends a master address and clock to the slaves. Communication is by means of a virtual frequency hopping channel whose hopping sequence is a function of the master address, and whose phase is a function of the master clock. Transmitted inquiry messages solicit slave address and topology information from the slaves, which may be used to generate a configuration tree for determining a route for a connection between the master and slave units.

U.S. Pat. No. 6,480,497 describes a technology for use in a mesh network communication system, where net throughput is optimized on the link between the communicating nodes by dynamically modifying signal characteristics of the signals transmitted between nodes in response to performance metrics which have been determined from analysis at the receivers for the corresponding links. The signal characteristics can be the data rate, modulation type, on-air bandwidth, etc. The performance metrics are calculated based on data-link on-air characteristics of received signals.

U.S. Patent Application No. 20070258508 describes a method and apparatus for communication in a wireless sensor network. In one embodiment, one or more routers in a network may be available for communication with one or more star nodes at a randomized time and/or frequency. A connectivity assessment, which may be performed at several different frequencies and/or times, may be performed to evaluate the quality of communications between devices in the network. Primary and secondary communication relationships may be formed between devices to provide for system redundancy. One or more proxies may be maintained where each proxy includes a status of one or more devices in the network, e.g., one or more star nodes or routers. Proxies may be used to handle information requests and/or status change requests, e.g., a proxy may be requested to change a communication relationship between devices in the network and may generate command signals to cause the corresponding devices to make the change.

What is needed is a method and system that enables wireless network devices to continue to operate and transmit/receive data even under conditions in which network devices may lose time synchronization. Thus, an apparatus and method for establishing data communication in a time-synchronized mesh wireless network during time synchronization failures are needed.

BRIEF DESCRIPTION OF THE DRAWINGS

Embodiments illustrated by way of example and not limitation in the figures of the accompanying drawings, in which.

DETAILED DESCRIPTION

Figure 1:
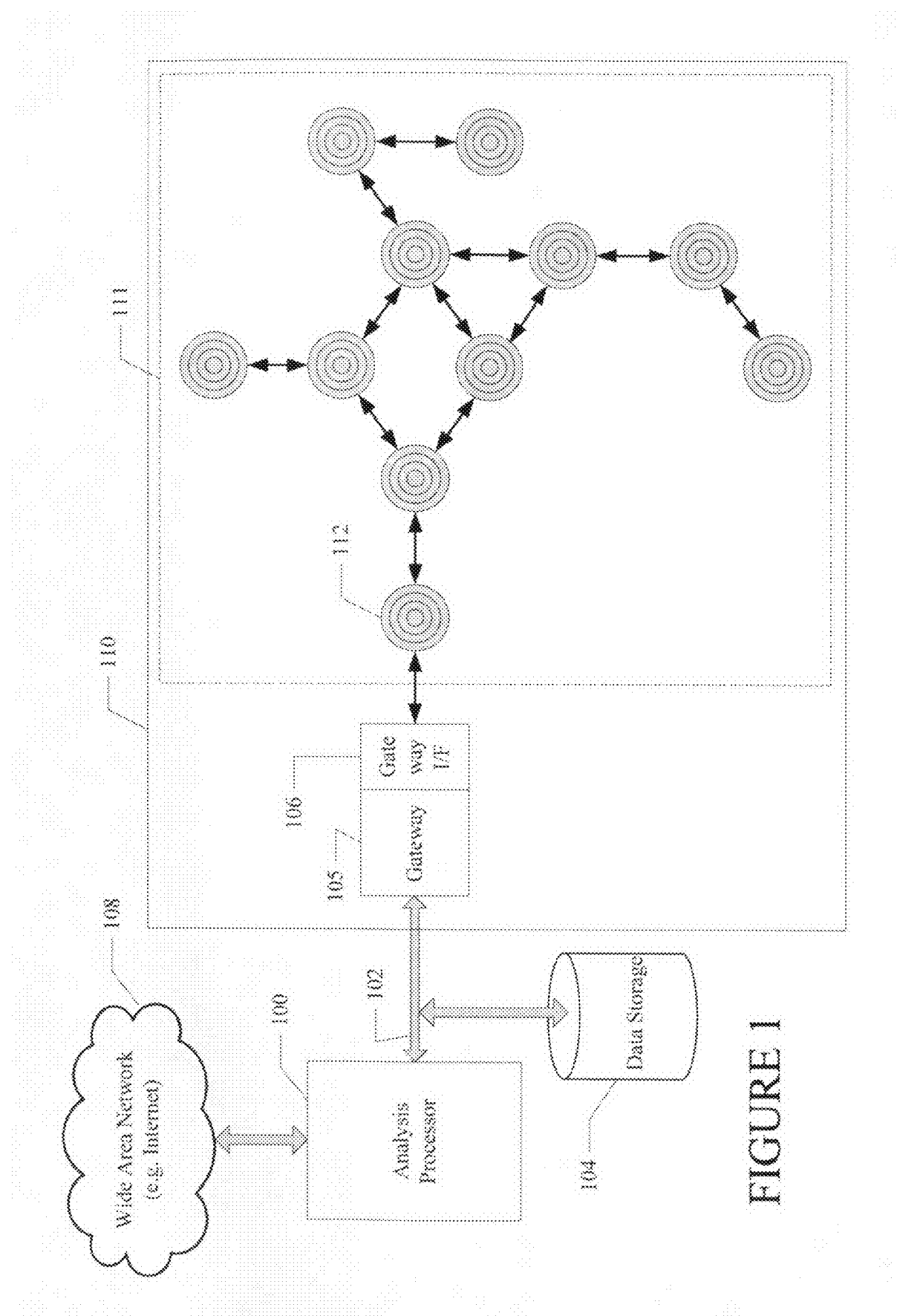
FIG. 1 illustrates a mesh data network environment in which various embodiments can operate.

In the following detailed description, reference is made to the accompanying drawings that form a part hereof, and in which are shown, by way of illustration, specific embodiments in which the disclosed subject matter can be practiced. It is understood that other embodiments may be utilized and structural changes may be made without departing from the scope of the disclosed subject matter.

According to various example embodiments of the disclosed subject matter as described herein, there is provided an apparatus and method for establishing data communication in a time-synchronized mesh wireless network during time synchronization failures. A particular embodiment relates to wireless data networks and more particularly to a multiple-hop wireless data communications employing a packet-switched time-sharing communications protocol. A particular embodiment has application to data collection from an array of sensors disposed in a network topology wherein at least two intelligent communication nodes are within reliable radio communication range within an array of peer communication nodes. The various embodiments of an example system and method described herein present an adaptive approach for managing packet routing in wireless sensor networks experiencing time synchronization failures to extend the operational lifetime of the network. The network and node configuration in a particular embodiment are described in more detail below.

In a particular embodiment described herein, wireless network devices (e.g., wireless, internally-powered, network sensor devices) are enabled to continue to operate and transmit/receive data even under circumstances in which network devices may lose or have lost time synchronization for data communications. In a particular embodiment, a wireless sensor network can be partitioned into at least two kinds of regions: 1) Hot Regions, and 2) Normal Regions. In the hot region, the wireless network devices within the region may be experiencing circumstances adversely affecting synchronization of data communications between wireless network nodes, may have experienced a time synchronization failure, or are encountering large local time drifts relative to a global time source. These large time drifts may have occurred because of some environmental condition (e.g., high temperatures) or some other circumstance that has created or may create a large time drift. These large local time drifts of the network devices in the hot region may cause these network devices to lose time synchronization with other network devices, including a gateway. The large time drifts cannot be corrected using conventional correction algorithms. Pre-defined maximum or atypical time drift values can be established that specify the point at which a network device's local time drift has become large enough or erratic enough, relative to a global time source, to cause the associated network device to transition into the hot region. As described above, any of a variety of circumstances may cause a network device to lose time synchronization with other network nodes. Network devices that may lose or have lost time synchronization for any reason can cause the associated network device to transition into the hot region. That is, any network device experiencing circumstances adversely affecting synchronization of data communications between wireless network nodes can transition to the hot region. The normal region of the network includes all network devices, which are not in the hot region. It will be apparent to those of ordinary skill in the art that the assignment of a particular node to a hot region or a normal region is a logical grouping of nodes in a network. It will also be apparent to those of ordinary skill in the art that nodes in the normal region do not necessarily need to be operating in a low power listening (LPL) mode. It will also be apparent to those of ordinary skill in the art that nodes in the normal region do not necessarily need to be communicating on the same channel as nodes in the hot region.

In the particular embodiments described herein, an operational system, method, and protocol is described that enables network devices in the hot region to recover from time synchronization losses and continue to communicate with other network devices. In an embodiment of this protocol, a network device in a wireless mesh network operates in either a normal mode or an alert mode. Network devices can enter into the alert mode when a network device experiences circumstances adversely affecting synchronization of data communications between wireless network nodes. In a particular embodiment, network devices can determine circumstances adversely affecting time synchronization between network devices in several ways: 1) an application can periodically use external sensors to monitor environmental or other exceptional condition changes; 2) a network device can use hardware sensors for alerting the network device of various circumstances; 3) a network device can use drift correction algorithms to predict that its calculated global time value is beyond the allowable drift; 4) a network device can loose periodic global time beacon packets a number of times, forcing the device to loose time synchronization with its neighbors; or 5) network devices or applications can force other network devices to enter into the alert mode to achieve specific network or application requirements. In the alert mode, a network device can automatically transition out of a low power mode (e.g., a radio off mode), and fully activate the network device's data communications radio. In the alert mode, the network device can also set the radio to a pre-defined common radio channel. The common radio channel may be necessary in wireless networking systems that use channel hopping or channel adaption to support channel diversity and/or protection from interference. This common channel can be used by the network device in the alert mode for all future network communication. The details of the system, method, protocol, and techniques for transmitting data in a time-synchronized mesh wireless network during time synchronization failures are provided below.

FIG. 1 illustrates a network environment of an example embodiment including a mesh network 110 of wireless sensors 112. Each of the sensors can be implemented as the combination of components illustrated in FIG. 2 and described in more detail below. Wireless sensor network (WSN) 110 includes a set of wireless sensors 112 and a gateway device 105 (collectively denoted nodes), each in data communication with others of its proximate neighbor nodes. The nodes 112 can communicate using established data communication protocols, typically at the Media Access Control (MAC) Layer. The MAC Layer is one of two sub-layers that make up the Data Link Layer of the well-known OSI networking model. The MAC layer is responsible for moving data packets to and from the network interface of one node to another node across a shared channel. A node can be any vertex or intersection in the communication network 110. A node may be passive or intelligent. In a particular embodiment, a node is assumed to be an intelligent node capable of receiving and analyzing information, taking certain actions as a result of received information, including the storing of received or processed information, modifying at least part of received information, and in some instances originating and retransmitting information. The details of a node of a particular embodiment are detailed in FIG. 2.

Referring still to FIG. 1, data packets or messages can be directed between any two nodes of the WSN 110 as each node has a unique identifier. A data packet or message is a self-contained unit of transmitted information. Typically, a data packet has a header, a payload, and an optional trailer. A link is a path which originates at one node and terminates at one other node. A link or path between nodes may include multiple hops between a plurality of intermediate nodes prior to reaching a destination node. The transfer of messages between two nodes of WSN 110 in a unicast or broadcast transmission is termed a local communication. Each of the nodes in the WSN 110 can maintain a neighborhood table that defines the set of nodes that are one hop away from a given node.

Each of the nodes 112 of WSN 110 can also communicate with a gateway 105 via a gateway interface 106. The gateway 105 provides a connection between the WSN 110 and an analysis processor 100. In an alternative embodiment, gateway 105 and gateway interface 106 can be located outside of the WSN 111. Gateway 105 can be implemented as any node of WSN 110. It will be apparent to those of ordinary skill in the art that in the description herein, variations of the WSN are still within the scope of the appended claims. Analysis processor 100 can be used to receive sensor data from any of the nodes 112 of WSN 110 via gateway 105 and to analyze the sensor data for aggregated environmental monitoring and control. Gateway 105 and analysis processor 100 can use a conventional data storage device 104 for data storage and retrieval. Analysis processor 100 can also include a connection to a wide area network 108, such as the Internet. In this manner, the gateway 105 and the other nodes of WSN 110 can obtain access to the Internet.

Gateway 105 can also provide synchronization timing for the nodes 112 of WSN 110. Gateway 105 can send periodic messages (also denoted as beacons or heartbeats) to each of the nodes 112 of WSN 110. Alternatively, any of the nodes 112 of WSN 110 can be designated to send the beacon to other nodes on the network. These periodic messages can include a timing signal to which each of the nodes 112 can synchronize their internal timers. Similarly, messages from gateway 105 to each of the nodes 112 can be used to provide system status, configuration, and control settings for the nodes of WSN 110. In an alternative embodiment, any of the nodes of the network or an agent may provide a network management message including the synchronization (timing) signal for the other network nodes. Alternatively, an external signal source may be used as a basis for the time synchronization of network nodes. Using any of the techniques described above, a common global clock can be provided for time synchronization of network nodes. The transfer of messages between the gateway 105 and each of the nodes 112 or between a node 112 and all other nodes of WSN 110 in a broadcast or multicast transmission is termed a global communication. According to a particular embodiment, communication between nodes 112 and/or between nodes 112 and gateway 103 occurs only at specific times and on specific channels for local and global data communications.

The WSN 110 can be configured in any of a variety of ways. Nodes 112 can be added, removed, or moved within the array of nodes of WSN 110. Each of the nodes of WSN 110 includes functionality to join or reconfigure itself in the WSN 110 when a node is added or moved. As part of this functionality, each node 112 can discover its neighbor nodes and automatically negotiate and establish communication paths with those neighbors. A node can be in data communication with neighbors that are within the radio reception range of the node. Depending on the strength of the wireless transceivers (e.g., radios) within each node of WSN 110, the distance between neighbor nodes is variable. Given that in some applications the environment in which WSN 110 is being used may be subject to radio interference, it is possible that the wireless data communications between nodes may be disrupted. In these cases, each node can sense the loss of data communications with a neighbor and may reconfigure itself to use alternate data paths through other functioning nodes of WSN 110. As such, the WSN 110 is highly adaptable to changing conditions in the environment and in the configuration of the wireless network.

Figure 2:
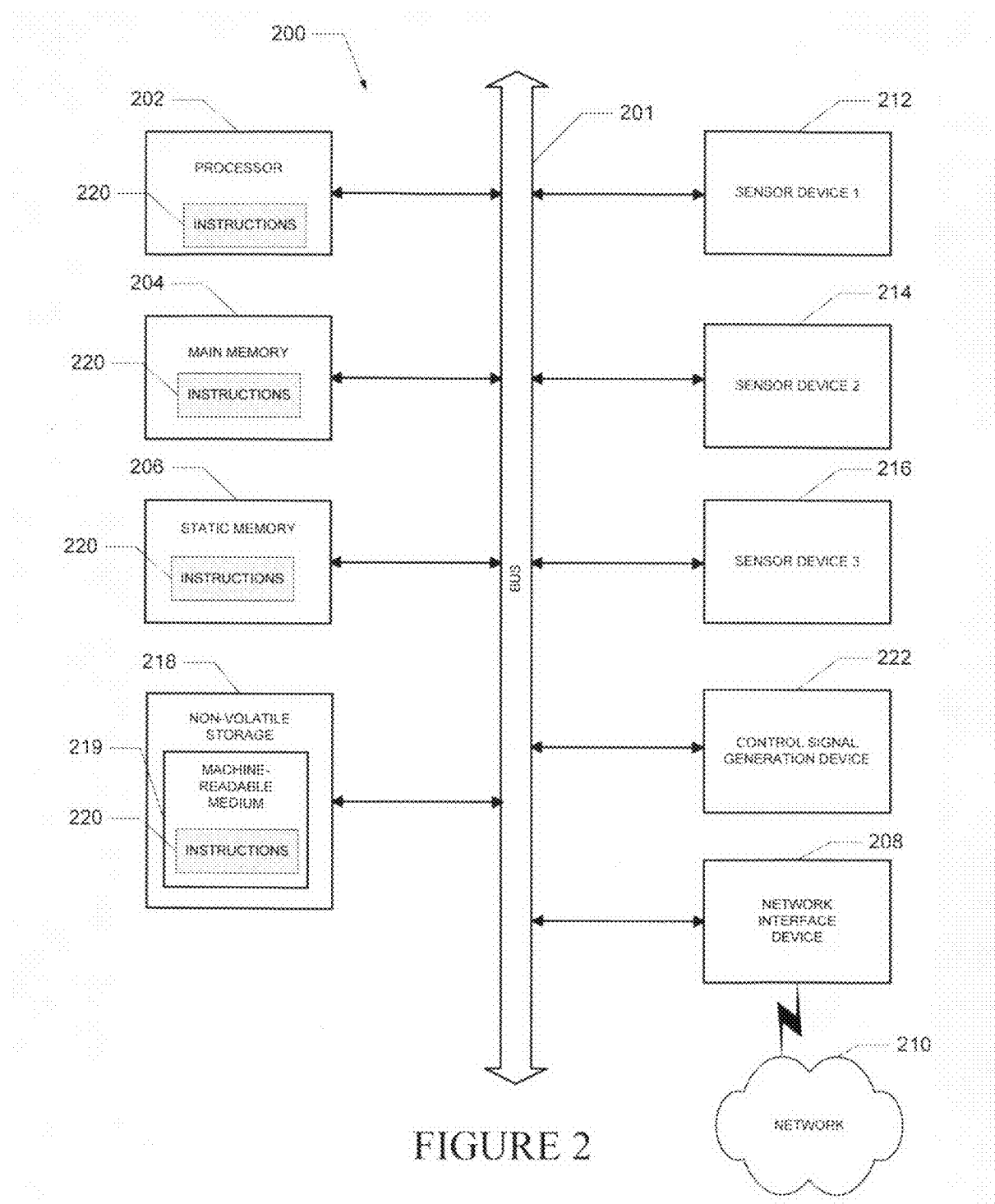
FIG. 2 illustrates an example embodiment of a node that can operate in a mesh network.

FIG. 2 shows a diagrammatic representation of a machine in the example form of a network node or sensor unit 200 within which a set of instructions, for causing the node to perform any one or more of the methodologies discussed herein, may be executed. In alternative embodiments, the node operates as a standalone device or may be connected (e.g., networked) to other machines. In a networked deployment, the node may operate in the capacity of a server or a client machine in client-server network environment, or as a peer machine in a peer-to-peer (or distributed) network environment, such as a mesh network. The node may be a computer, an intelligent sensor, a logic device, an application specific integrated circuit (ASIC), a field programmable gate array (FPGA), a process logic controller (PLC), a hard-wired module, a network router, gateway, switch or bridge, or any machine capable of executing a set of instructions (sequential or otherwise) that specify actions to be taken by that machine. Further, while a single machine is illustrated in FIG. 2, the term "machine" or "node" shall also be taken to include any collection of machines that individually or jointly execute a set (or multiple sets) of instructions to perform any one or more of the methodologies discussed herein.

The example node 200 of a particular embodiment includes a processor 202 (e.g., a central processing unit (CPU)), a main memory 204 and optionally a static memory 206, which communicate with each other via a bus 201. The node 200 may further include one or more sensor devices 212, 214, and 216. These sensor devices can include temperature sensors, humidity sensors, air flow sensors, particle counters, and/or other types of sensors for detecting and measuring a desired condition. The sensor devices 212, 214, and 216 can also include security devices, such as motion detectors, acoustical detectors, seismic detectors, vibration detectors, metal detectors, magnetic anomaly detectors, explosives detection, and the like. Additionally, sensor devices 212, 214, and 216 can also include process control devices, such as conveyor motion activation and status, robotic system activation and status, machine system activation and status, and the like. In general, sensor devices 212, 214, and 216 can include any sensors for determining, detecting and/or measuring a desired circumstance or exceptional condition within an environmental or other management system, process control system, building management system, or the like.

The node 200 may further include a non-volatile memory 218, a control signal generation device 222, and a network interface device 208 (e.g., a radio transceiver). The non-volatile memory 218 includes a machine-readable medium 219 in which is stored one or more sets of instructions (e.g., software 220) embodying any one or more of the methodologies or functions described herein. The instructions 220 may also reside, completely or partially, within the main memory 204, the static memory 206, and/or within the processor 202 during execution thereof by the node 200. The main memory 204, static memory 206, and the processor 202 also may constitute machine-readable media. The software, instructions, and/or related data 220 may further be transmitted or received over a network 210 via the network interface device 208. The network interface device 208, in a wireless node configuration of one embodiment, may include a radio transceiver for sending and receiving data to/from network 210 using a wireless data transfer protocol, such as the family of 802.11 standards from IEEE. In this manner, node 200 can perform wireless data communications with other nodes of WSN 110. The control signal generation device 222 can be used to control the operation of any system external to the WSN 110, such as an environmental management system, process control system, building management system or other device or system that can alter the conditions being monitored by sensors 212, 214, and 216.

Typically in wireless network systems, the wireless data transceivers (e.g., radios) in the network nodes consume the most electrical power and represent the largest drain on the node's battery power. As such, the radio should be turned off (de-activated) for most of the time to increase the battery lifetime of the nodes. In an example embodiment, all nodes of WSN 110 are time synchronized. In order to conserve battery power, each node wakes up (i.e., activates its radio for network data communications) for a short period of time for radio communication with other nodes or the gateway. Then, the node's radio is de-activated and the node sleeps (i.e., de-activates its radio to conserve battery power) until the next scheduled communication cycle.

In a particular example embodiment described herein, an apparatus and method is described for transmitting data in a time-synchronized mesh wireless network during time synchronization failures. The method and system of a particular embodiment seamlessly enable wireless sensor devices to continue to operate and transmit data even under conditions in which network devices may lose time synchronization.

Figure 3:
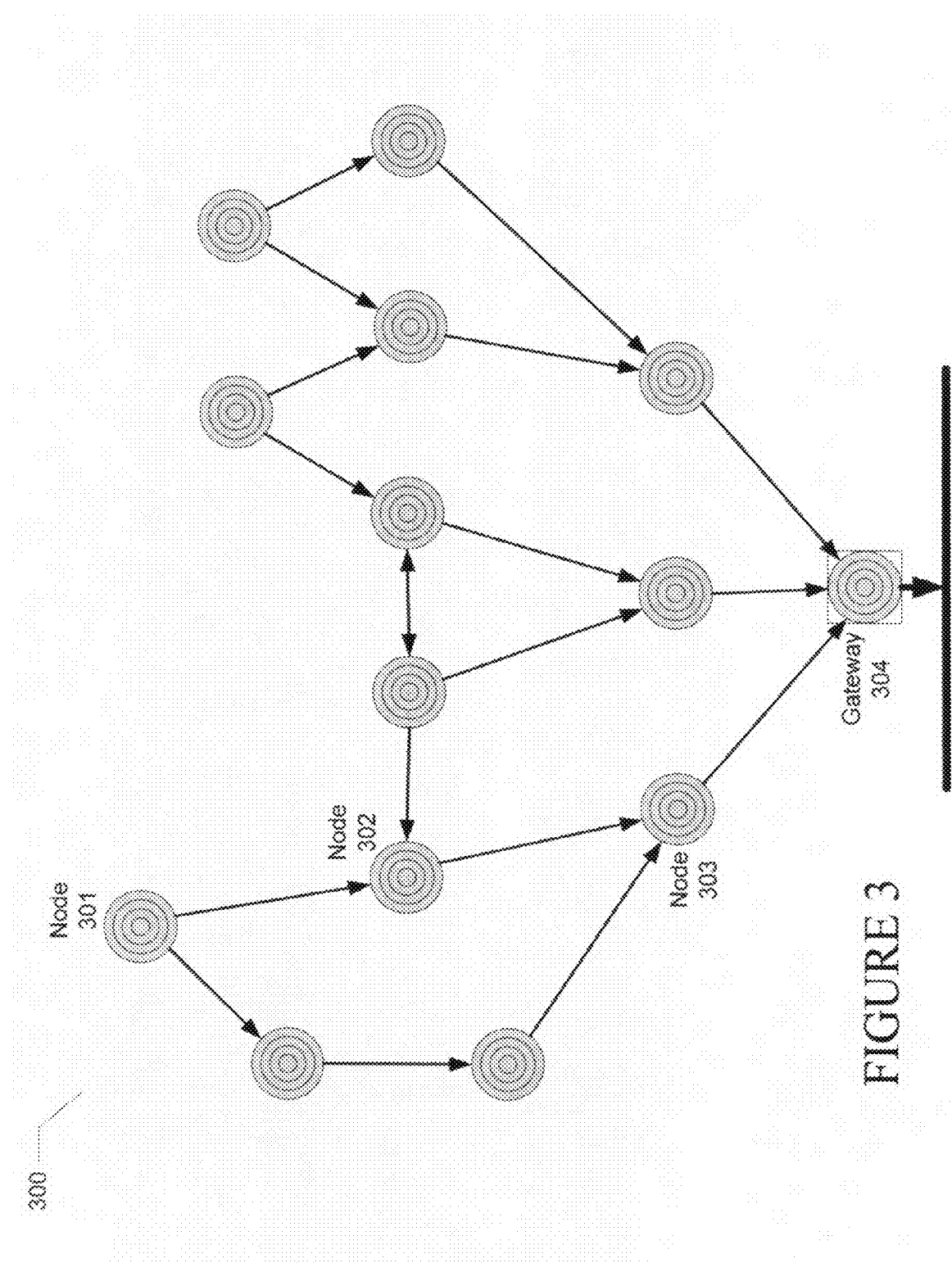
FIGS. 3-6 illustrate examples of various configurations of network devices in a mesh network of an example embodiment.
Figure 4:
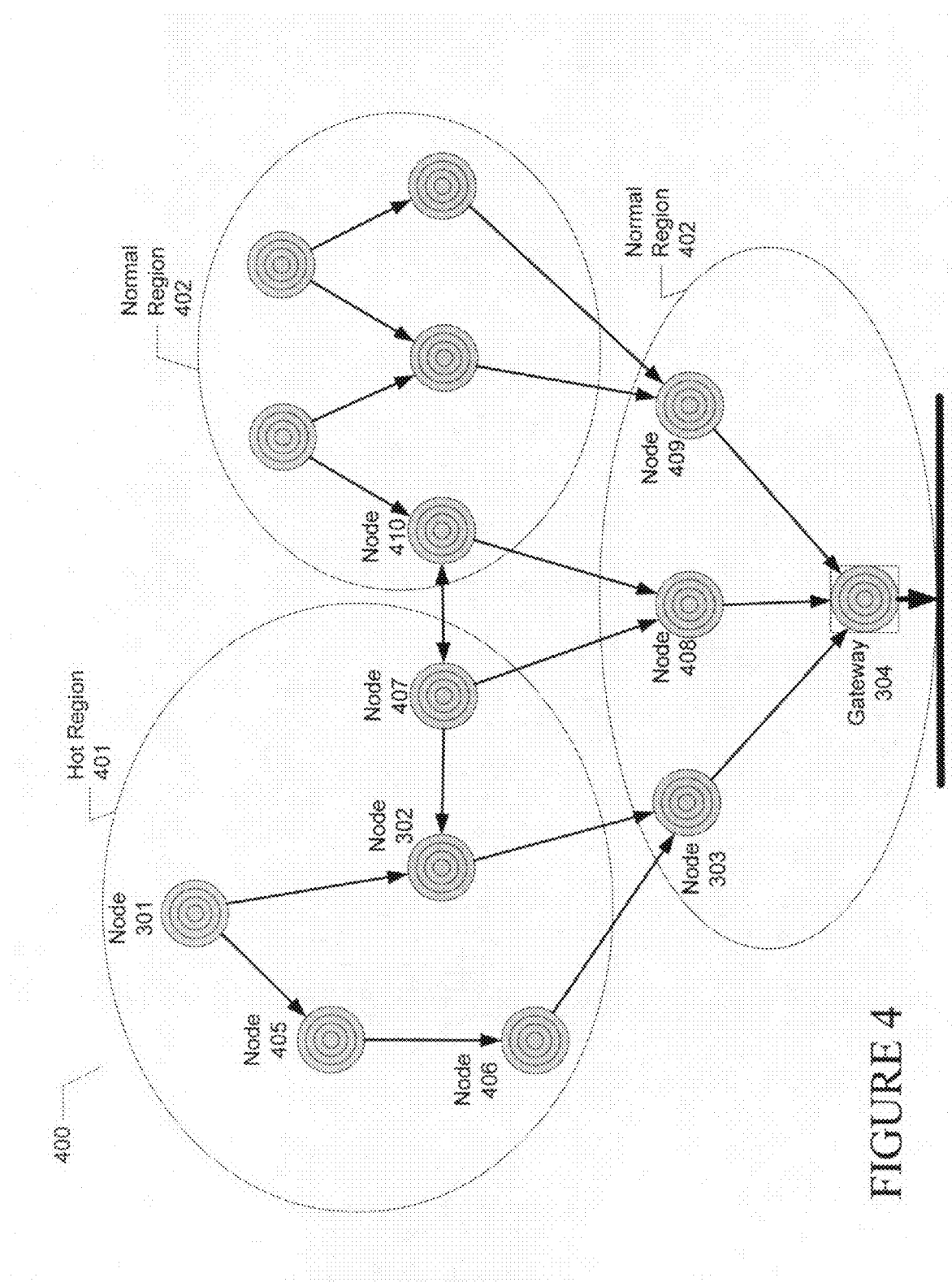
Figure 5:
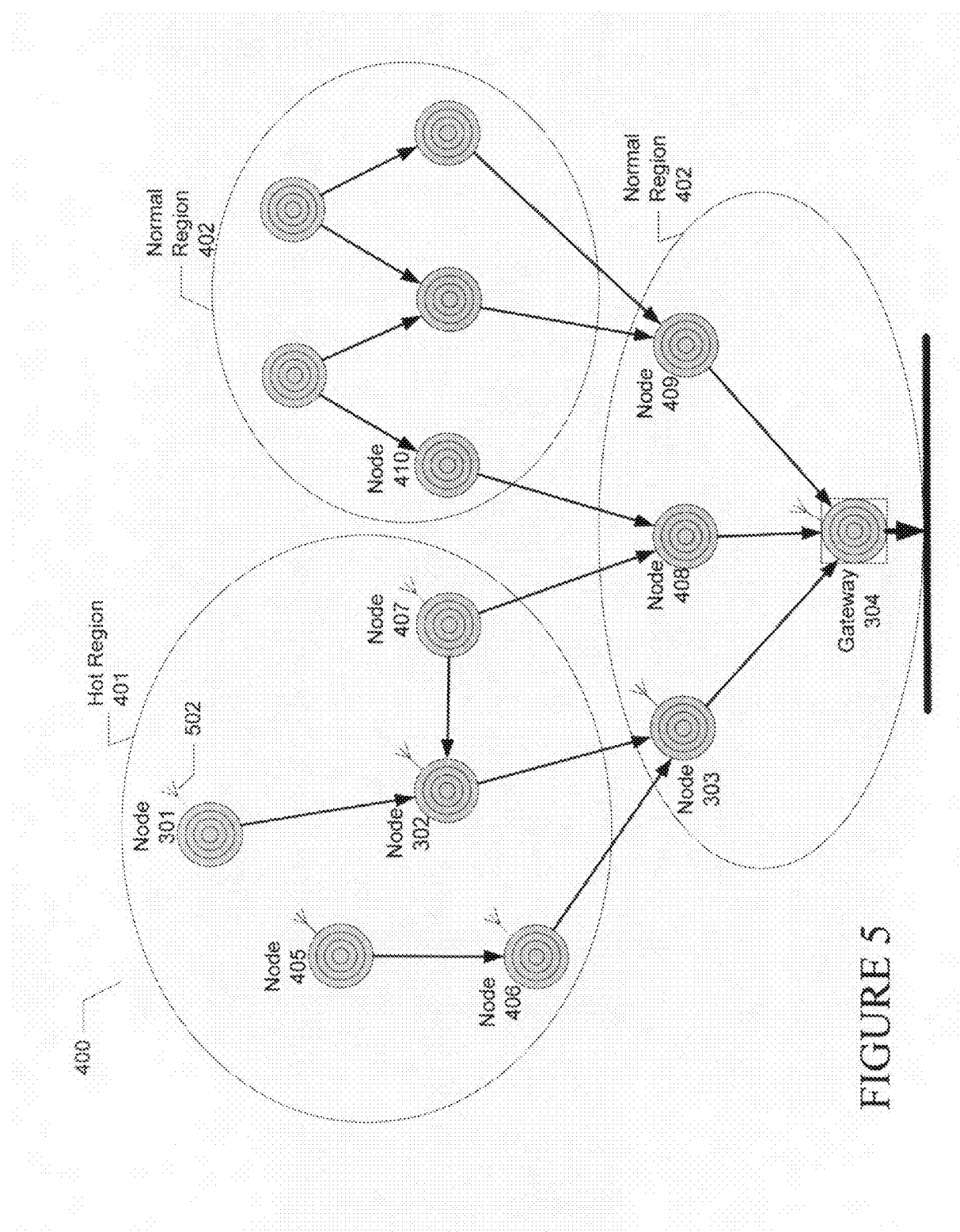

Referring now to FIGS. 3-5, examples of various configurations of network devices in a mesh network of an example embodiment are illustrated. In the normal condition of a wireless mesh network as described above, network devices can inter-communicate to form a wireless mesh network, synchronize with each other using a common global clock, and transfer data to/from a gateway and/or other network devices. For example, as shown in FIG. 3, an example wireless data network 300 is shown. In wireless network 300, network devices (nodes) 301, 302 and 303 can be synchronized to the common global clock. These nodes, and others of the nodes in wireless network 300, can route data from a source node towards a gateway node 304. These nodes of wireless network 300 normally operate in one of two modes: 1) a low power listening (LPL) mode, and 2) a data transfer mode. In the low power listening mode, the nodes sleep (i.e., de-activate their radio to conserve battery power) most of the time. In a data transfer mode, a node can wake up (i.e., activate its radio for network data communications) and begin a network data transmission or network monitoring activity. According to a pre-configured wake-up schedule adopted by each of the nodes during an initialization phase, the nodes of network 300 can synchronize their wake-up cycles so that a transmitting node can wake up at the same time a receiving node is awake. This synchronization between nodes is critical for data communication between nodes. The synchronization is based on the common global clock, which is used to calibrate the internal clocks within each node. Network devices can manage their synchronization to global time by mapping a local time reading from the network device resident hardware clocks to the reference common global time value. If the timing synchronization between nodes is operating properly, or with a pre-defined tolerance (i.e., the timing drift between node clocks is within tolerance), data communications between nodes can be accomplished in a normal and efficient manner.

For the example illustrated in FIG. 3, if node 301 needs to send data towards gateway 304, node 301 can wake up at the same time as node 302 (the wake-up time being pre-configured), send data to node 302 and then node 301 can sleep. Node 302 can use the same mechanism to transmit the data received from node 301 to node 303. In the same manner described above, node 302 can wake up at the same time as node 303, send the data to node 303 and then node 302 can sleep. Finally, in a normal network operating mode, the data will reach the gateway 304, which can transmit the data to a server that can process the data originating from node 301. In a similar manner, any of the nodes in example network 300 can wake up and route data towards gateway 304, provided that the timing drift between node clocks remains within tolerance.

Because of any of the circumstances, conditions, or events described above, network nodes in a time-synchronized mesh wireless network may experience circumstances adversely affecting synchronization of data communications between wireless network nodes. As a result, network devices in the network 300 may lose or start to lose synchronization with respect to the reference common global time and thereby lose synchronization with respect to the clocks of other network nodes. The hardware clocks in the wireless network devices usually have a timing drift that causes the local node clock readings to deviate away from the common global time value. Over time, this timing deviation can become significant. The hardware clock drifts, therefore, can cause the mapping from a local clock value to a network device's notion of global time value to deviate significantly from the actual global time. In some cases, non-linear and very large clock drifts may occur when the network devices (and their internal hardware clock) experience rapid changes in the environmental conditions or other conditions in which they are operating (e.g., temperature changes). Such rapid changes can result in very large local time drifts that cannot be compensated easily with drift correction algorithms. The calculated global time value at particular nodes can therefore deviate significantly from the actual global time value. This significant timing deviation can cause the network devices to lose time synchronization with each other, thereby losing the ability to transmit data through the wireless mesh network. As described above, a variety of other circumstances can also adversely affect or otherwise cause a loss of time synchronization between network devices in a time-synchronized mesh wireless network.

FIG. 4 illustrates an example of the configuration of network devices in a time-synchronized mesh wireless network 400 of the example embodiment shown in FIG. 3; except in this example network, we assume that a circumstance adversely affecting time synchronization between network devices is being experienced or has been experienced between nodes 301 and 302. Nodes 405-407 may have also experienced the circumstance adversely affecting network device internal timing. As described above, such circumstances can result in very large local time drifts and a loss of synchronization of affected nodes. In particular embodiments, network devices can determine circumstances adversely affecting time synchronization between network devices in several ways: 1) an application can periodically use external sensors to monitor environmental or other exceptional condition changes; 2) a network device can use hardware sensors for alerting the network device of various circumstances; 3) a network device can use drift correction algorithms to predict that its calculated global time value is beyond the allowable drift; 4) a network device can loose periodic global time beacon packets a number of times, forcing the device to loose time synchronization with its neighbors; or 5) network devices or applications can force other network devices to enter into the alert mode to achieve specific network or application requirements. Once a network node has experienced circumstances adversely affecting synchronization of data communications between wireless network nodes or has been forced into an alert mode, the network node becomes a member of a 'hot region', in which special procedures and protocols, described in more detail below, are used to prevent a node from losing data communication with other nodes in the wireless network.

Referring again to the example shown in FIG. 4, the wireless network 400 has been partitioned into two kinds of regions: Hot Region 401 and Normal Region 402. In the hot region 401, the network devices (such as nodes 301, 302, and 405-407) have experienced circumstances adversely affecting synchronization of data communications between wireless network nodes or have been forced into an alert mode. These nodes may have large local time drifts, and may lose time synchronization with other network devices because of a variety of circumstances. These nodes may not be able to send data to the gateway 304, because of the large local time drifts. For instance, node 301 may not be able to send its data through node 302 as both node 301 and node 302 may wake up at different global times, because of the large local time drifts. In the example of FIG. 4, devices in the normal region 402 are not subject to these large local time drifts and therefore continue to operate normally in the low power listening mode or other normal operations mode.

A protocol is now described that enables network devices in the hot region 401 to recover from time synchronization losses and enables these nodes to continue to communicate with other nodes in the network 400. In this protocol, a network device operates in either a normal mode or an alert mode. A network device can transition into the alert mode when the network device experiences circumstances adversely affecting synchronization of data communications between wireless network nodes, as described above. In the alert mode, a network device can automatically transition out of the low power mode, and fully activate the network device's data communications radio, or activate the network device's data communications radio for a longer period of time relative to the low power mode. In the alert mode, the network device can also set the radio to a pre-defined common channel. This common channel can be used by the network device in the alert mode for all future network communication, until the network device transitions out of the alert mode. In a particular embodiment, network nodes in hot region 401 and network nodes in normal region 402 do not need to communicate using the same channel.

Once a network device in hot region 401 has transitioned to the alert mode, the network device can access its neighborhood table to find identifiers to its neighbor nodes. Neighbor nodes can be nodes that are one hop away from a given node. In order to illustrate an example of the inventive protocol, we assume that a node in hot region 401 needs to send data to gateway 304. We call this node the source node. The source node needs to use a neighbor node to route data to gateway 304. We call this neighbor node the router node. Using its neighborhood table, the source node can identify a router node. The source node wants to use the router node to route data towards gateway 304. In a normal mode, the source node could simply communicate with the router node during the router node's scheduled wake up time. However, because of the circumstances adversely affecting synchronization of data communications between wireless network nodes as described above, the source node cannot be sure the router node will be awake when the source node is expecting the router node to be awake. For this reason, the source node needs to take special steps to establish a communication link with the router node while the source node is in the alert mode. In attempting to establish this communication link with the router node, the source node can encounter one of three possible scenarios. These three scenarios and the corresponding actions taken by the source node to establish this communication link with the router node while the source node is in the alert mode are described below.

Scenario 1: The Router Node is in Hot Region 401 and the Router Node has Lost Time Synchronization.

Referring again to FIG. 4, consider network nodes 301 and 302 as shown in the example of FIG. 4. Both nodes 301 and 302 are in hot region 401 and have lost time synchronization for the reasons described above. Both nodes 301 and 302 have transitioned to the alert mode, and both nodes have their radios active and are listening to other network devices full time (or substantially full time), as also described above. We assume for this example that node 301 is the source node and node 302 is the router node. Before source node 301 can transmit data through router node 302, source node 301 can initiate a series of enquiry messages to probe the status of router node 302. If router node 302 satisfactorily receives the enquiry messages from source node 301, router node 302 can respond to the source node 301 in one of several ways:

Router node 302 may acknowledge the message from source node 301 and may respond to the source node 301 with the status of router node 302.

Router node 302 may create a temporary local data communications schedule, which specifies a time when source node 301 can send data to router node 302. This local schedule can be communicated to source node 301 in a response message. This local schedule does not need to be precise, especially given that the radios of both network devices (301 and 302) are fully powered and active. By creating a local schedule, router node 302 can reduce the number of network devices that may try to send data to router node 302 at the same time.

Using any of the response processes described above, router node 302 can respond to the source node 301. Once the router node 302 responds to the source node 301 and the status of router node 302 is ascertained, source node 301 can begin to transmit its data to router 302 for forwarding to gateway 304. If router node 302 must route data through another intervening node in hot region 401 on a path to gateway 304, router node 302 can use the same process described above to establish a communication link with the intervening node in hot region 401. Eventually, the data can be received at the gateway 304.

Scenario 2: The Router Device is Operating Normally.

Referring still to FIG. 4, consider network nodes 302 and 303 as shown in the example of FIG. 4. In this example, node 302 is in alert mode and in the hot region 401. As such, node 302 has lost time synchronization with other network nodes. Node 303 is in normal mode and in normal region 402. Node 303 is therefore synchronized to the common global clock and with other nodes in normal region 402. We assume for this example that node 302 is the source node and node 303 is the router node. Before source node 302 can transmit data through router node 303, source node 302 can initiate connection with router node 303 by sending a series of enquiry messages. However, the enquiry messages sent by the source node 302 may not be acknowledged by the router node 303 as the radio in router node 303 may be turned off, because router node 303 is operating in a normal low power mode. If the enquiry messages sent by the source node 302 are not acknowledged by the router node 303, the source node 302 may attempt the same process described above for establishing a communications link with a different neighbor node of source node 302. After trying other neighbor nodes and failing to establish a communications link with a router node, source node 302 can send a series of short messages, called jamming messages, to its neighbor nodes for a short duration of time. The duration of the jamming messages needs to be long enough to guarantee that router node 303 will receive at least one of the jamming messages when router node 303 activates its radio according to the standard mode procedure of router node 303. The duration of the series of the jamming messages can either be pre-configured to a fixed amount or can be derived from router node 303's wakeup schedule (time durations between different wakeups) that the router node may have sent earlier to source node 302. Upon receiving the jamming message from source node 302, router node 303 can transition to the alert mode, activate its radio, and set the radio to the pre-configured common channel used in the alert mode. Because router node 303 is now in the alert mode, router node 303 can receive data from source node 302.

Once the router node 303 has been forced into the alert mode as a result of the jamming messages from the source node 302, a communication link between the source node 302 and the router node 303 has been established. At this point, the source node 302 can begin to transmit its data to router node 303 for forwarding to gateway 304. If router node 303 must route data through another intervening node in normal region 402 on a path to gateway 304, router node 303 can use the same process described above to force an intervening node into the alert mode and thereby establish a communication link with the intervening node. Alternatively, the router node 303 can use a normal mode data communications procedure to establish a communication link with the intervening node in the normal region 402. This process can be repeated until all network devices on the communication path from the source node 302 to the gateway 304 are in alert mode. At the end of this process, the entire network 400 is divided into two regions, 1) the hot region 401, and 2) the normal region 402. As described above, data communications can thereby be established between a source node, intervening router nodes, and the gateway node 304. Eventually, the data from a source node can be received at the gateway 304.

Scenario 3: The Router Device is a Gateway.

Figure 6:
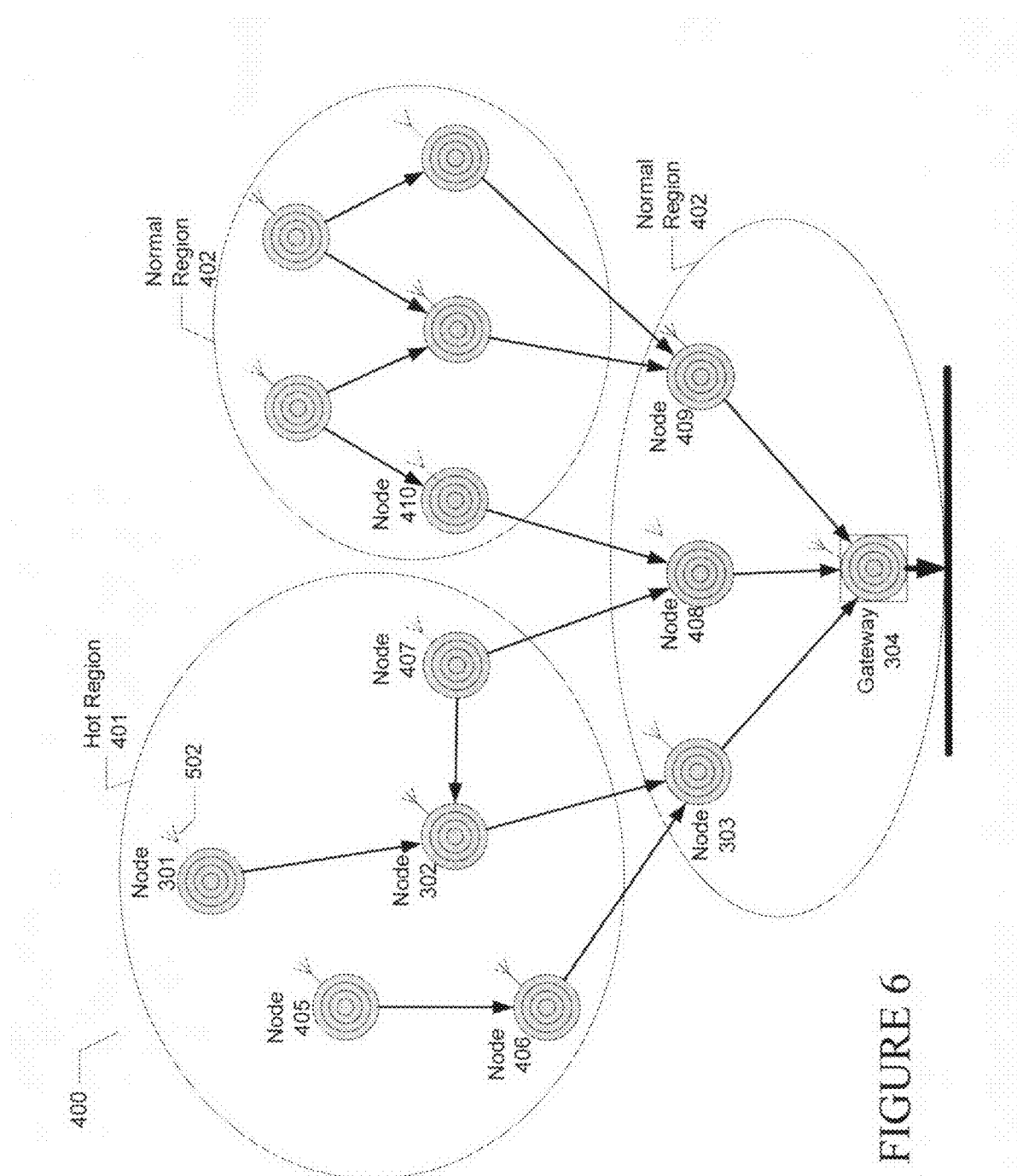
Figure 7:
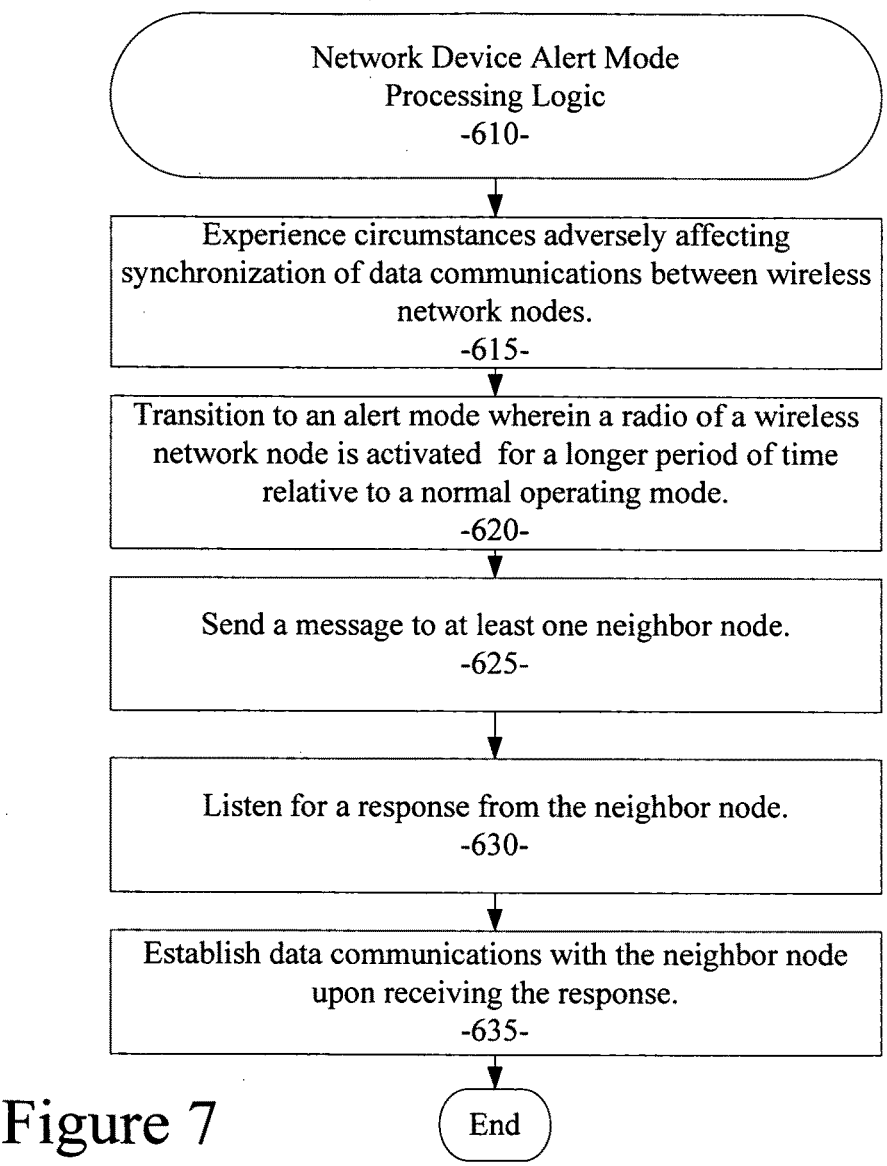
FIG. 7 is a flow diagram illustrating the processing flow for a particular example embodiment.

Referring still to FIG. 4, consider network node 303 and gateway 304 as shown in the example network 400 of FIG. 4. In this example, node 303 may wake up gateway 304 by forcing gateway 304 into the alert mode as described above or the radio in gateway 304 may be active all the time (or a substantial amount of time), depending on the pre-configured state of a particular network. In either case, gateway 304 can enter or remain in the alert mode. In the alert mode, gateway 304 can inform all one hop neighbor nodes (such as nodes 303, 408, and 409 shown in the example of FIG. 4) that gateway 304 has entered the alert mode, and will be listening on a specific channel. In various embodiments, two scenarios may be implemented. In a first scenario, the gateway 304 can force all one-hop neighbors to go into the alert mode, which propagates to all nodes in the network. In this case, every node in the network is in the alert mode. An embodiment of this scenario is illustrated in FIG. 6. Although an embodiment of this scenario can support the routing of messages through a particular network while the network (or portions thereof) is experiencing circumstances adversely affecting time synchronization of data communications between wireless network nodes, this embodiment may not be as power efficient as an embodiment of a second scenario. In the second scenario, only one hop neighbor nodes on the data path from the source node 301 to gateway 304 that are in the normal mode can transition to a mode in which the one hop neighbor nodes can listen to the gateway 304 on a specific channel. The one hop neighbor nodes, which are not on the data path from the source node 301 to gateway 304, can continue to conduct data communications with their neighbor nodes using a normal mode (e.g., LPL mode) communications process or previously used communications processes. An embodiment of this second scenario is illustrated in FIG. 5. In this example, the neighbors of the one hop neighbor nodes of gateway 304 do not need to transition to the alert mode even though the gateway 304 has transitioned to the alert mode. The one hop neighbor nodes therefore shield the normal region 402 nodes from the changes required to enable hot region 401 nodes to send data to gateway 304.

FIG. 5 illustrates the state of the example network 400, using the second scenario embodiment described above, after all nodes on the data path from node 301 to gateway 304 have transitioned from a normal operations mode to an alert mode. In FIG. 5, network nodes shown with an adjacent symbol 502 have transitioned to an alert mode as described above. The radios on these alert mode network nodes are active at all times or for a substantial amount of time in response to the circumstance adversely affecting synchronization of data communications between wireless network nodes in hot region 401. Network nodes shown in FIG. 5 without an adjacent symbol 502 have not transitioned to an alert mode and remain in a normal operations mode (e.g., typically in a low power listening (LPL) mode).

Referring again to the example network 400 shown in FIG. 5, note that all nodes in hot region 401 have transitioned to an alert mode because either, 1) the node experienced circumstances adversely affecting synchronization of data communications between wireless network nodes, or 2) a neighbor node sent a message causing the node to transition to the alert mode. Note also, as shown in the example of FIG. 5, that because of the circumstances adversely affecting synchronization of data communications between wireless network nodes experienced by hot region 401 nodes, data communication synchronization between node 301 and node 405 has been lost. Similarly, because of the circumstances adversely affecting synchronization of data communications between wireless network nodes experienced by hot region 401 nodes, data communication synchronization between node 407 and node 410 has been lost. In the example of FIG. 5, source node 301 needed to find a data path from node 301 to gateway 304 in spite of the degraded data communications environment caused by the circumstances adversely affecting synchronization of data communications between wireless network nodes. As described above and shown in FIG. 5, node 301 has established a data communication path to node 302 using the scenario 1 procedures described above. Both node 301 and node 302 are operating in the alert mode as shown by symbol 502 in FIG. 5. As described above and shown in FIG. 5, node 302 has established a data communication path to node 303 using the scenario 2 procedures described above. Both node 302 and node 303 are operating in the alert mode as shown by symbol 502 in FIG. 5. In this example, node 303 has been forced into the alert mode after receiving a message from node 302, which is operating in the alert mode. As described above and shown in FIG. 5, node 303 has established a data communication path to gateway 304 using the scenario 3 procedures described above. Both node 303 and gateway 304 are operating in the alert mode as shown by symbol 502 in FIG. 5. In this example, gateway 304 has either been forced into the alert mode after receiving a message from node 303 or gateway 304 was already in the alert mode as previously configured. Thus, as shown in the example of FIG. 5 and described herein, source node 301 has established a data path from node 301 to gateway 304 in spite of the degraded data communications environment caused by the circumstances adversely affecting synchronization of data communications between wireless network nodes. Other nodes in hot region 401 can similarly establish a data communications path to gateway 304 and/or to other nodes in the network 400. In this manner, nodes in network 400 can establish and maintain data paths between nodes even in the presence of the circumstances adversely affecting synchronization of data communications between wireless network nodes.

Each data packet in a data communication between nodes can be marked as a data communication from a network device operating in an alert mode. A network device operating in an alert mode can mark a bit (or load a distinctive value, or otherwise mark a data packet with an alert mode indication) in the data packet to indicate that the network device is still operating in the alert mode. As long as the network devices and the gateways keep routing data packets with alert mark bits, the network devices will remain in the alert mode and network data communications will be handled according to an embodiment of the protocol described above. Once the circumstances adversely affecting synchronization of data communications between wireless network nodes are no longer present, each network device in the hot region 401 can stop sending data packets with alert bits. All network devices and the gateways can then return to a normal operating mode, if the network devices do not receive any data packets with alert bits for a pre-configured amount of time. In the normal mode, the network devices can re-synchronize, enter a low power listening (LPL) mode, and continue to operate in the normal manner.

The systems, methods, and protocols described herein for various embodiments can also be used for time-synchronized mesh wireless networks in which a path between nodes in the network can be tunneled using the protocol described above. In a particular embodiment, the normal data communications scheduling for particular nodes can be pre-empted using the protocol described herein. In this manner, a tunnel or data path between nodes can be forced using the protocol described herein.

In other embodiments, network nodes may normally operate in a non-optimized (e.g., alert) mode wherein the normal nodes do not use a LPL mode to conserve battery power. In this case, a particular node can use a LPL mode as a configurable option for optimization. When the particular node experiences circumstances adversely affecting synchronization of data communications between wireless network nodes, the particular node can use the protocol described above to recover from a loss of synchronization of data communications.

FIG. 6 is a processing flow diagram illustrating the basic processing flow 610 for a particular embodiment. As shown, an example embodiment includes experiencing circumstances adversely affecting synchronization of data communications between wireless network nodes (processing block 615); transitioning to an alert mode wherein a radio of a wireless network node is activated for a longer period of time relative to a normal operating mode (processing block 620); sending a message to at least one neighbor node (processing block 625); listening for a response from the neighbor node (processing block 630); and establishing data communications with the neighbor node upon receiving the response (processing block 635).

Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In example embodiments, a node configured by an application may constitute a "module" that is configured and operates to perform certain operations as described herein. In other embodiments, the "module" may be implemented mechanically or electronically. For example, a module may comprise dedicated circuitry or logic that is permanently configured (e.g., within a special-purpose processor) to perform certain operations. A module may also comprise programmable logic or circuitry (e.g., as encompassed within a general-purpose processor or other programmable processor) that is temporarily configured by software to perform certain operations. It will be appreciated that the decision to implement a module mechanically, in the dedicated and permanently configured circuitry, or in temporarily configured circuitry (e.g., configured by software) may be driven by cost and time considerations. Accordingly, the term "module" should be understood to encompass a functional entity, be that an entity that is physically constructed, permanently configured (e.g., hardwired) or temporarily configured (e.g., programmed) to operate in a certain manner and/or to perform certain operations described herein.

While the machine-readable medium 219 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies described herein. The term "machine-readable medium" shall accordingly be taken to include, but not be limited to, solid-state memories, optical media, and magnetic media.

As noted, the software and/or related data may be transmitted over a network using a transmission medium. The term "transmission medium" shall be taken to include any medium that is capable of storing, encoding or carrying instructions for transmission to and execution by the machine, and includes digital or analog communication signals or other intangible media to facilitate transmission and communication of such software and/or data.

The illustrations of embodiments described herein are intended to provide a general understanding of the structure of various embodiments, and they are not intended to serve as a complete description of all the elements and features of components and systems that might make use of the structures described herein. Many other embodiments will be apparent to those of ordinary skill in the art upon reviewing the description provided herein. Other embodiments may be utilized and derived, such that structural and logical substitutions and changes may be made without departing from the scope of this disclosure. The figures herein are merely representational and may not be drawn to scale. Certain proportions thereof may be exaggerated, while others may be minimized. Accordingly, the specification and drawings are to be regarded in an illustrative rather than a restrictive sense.

The description herein may include terms, such as "up", "down", "upper", "lower", "first", "second", etc. that are used for descriptive purposes only and are not to be construed as limiting. The elements, materials, geometries, dimensions, and sequence of operations may all be varied to suit particular applications. Parts of some embodiments may be included in, or substituted for, those of other embodiments. While the foregoing examples of dimensions and ranges are considered typical, the various embodiments are not limited to such dimensions or ranges.

The Abstract is provided to comply with 37 C.F.R. §1.74(b) to allow the reader to quickly ascertain the nature and gist of the technical disclosure. The Abstract is submitted with the understanding that it will not be used to interpret or limit the scope or meaning of the claims.

In the foregoing Detailed Description, various features are grouped together in a single embodiment for the purpose of streamlining the disclosure. This method of disclosure is not to be interpreted as reflecting an intention that the claimed embodiments have more features than are expressly recited in each claim. Thus the following claims are hereby incorporated into the Detailed Description, with each claim standing on its own as a separate embodiment.

Thus, as described herein, an apparatus and method for establishing data communication in a time-synchronized mesh wireless network during time synchronization failures is disclosed. Although the disclosed subject matter has been described with reference to several example embodiments, it may be understood that the words that have been used are words of description and illustration, rather than words of limitation. Changes may be made within the purview of the appended claims, as presently stated and as amended, without departing from the scope and spirit of the disclosed subject matter in all its aspects. Although the disclosed subject matter has been described with reference to particular means, materials, and embodiments, the disclosed subject matter is not intended to be limited to the particulars disclosed; rather, the subject matter extends to all functionally equivalent structures, methods, and uses such as are within the scope of the appended claims.

We claim:

1. A method comprising:
   experiencing circumstances adversely affecting time synchronization of data communications between wireless network nodes in a wireless mesh network, the circumstances causing a network node to lose time synchronization with other network nodes;
   transitioning to an alert mode wherein a radio of a wireless network node is activated for a longer period of time relative to a normal low power mode, the transitioning to the alert mode being performed when a network node loses time synchronization with other network nodes;
   setting the radio of the wireless network node to a pre-defined common radio channel while in the alert mode for communicating with other network nodes;
   sending a message to at least one neighbor node;
   listening for a response from the neighbor node; and
   establishing data communications with the neighbor node upon receiving the response.

2. The method as claimed in claim 1 including listening for a response from the neighbor node on a pre-defined common channel.

3. The method, as claimed in claim 1 wherein the response from the neighbor node includes a status of the neighbor node.

4. The method as claimed in claim 1 wherein the response from the neighbor node includes a temporary local data communications schedule.

5. The method as claimed in claim 1 wherein the message sent to at least one neighbor node is a jamming message causing the neighbor node to transition to the alert mode.

6. The method as claimed in claim 1 wherein the circumstances are a rapid rise in temperature.

7. The method as claimed in claim 1 wherein the circumstances are a clock failure.

8. The method as claimed in claim 1 including tunneling a data path to a neighbor node.

9. The method as claimed in claim 1 wherein all wireless network nodes of the wireless mesh network operate in the alert mode for at least a portion of time.

10. The method as claimed in claim 1 wherein a plurality of wireless network nodes of the wireless mesh network do not operate in the alert mode for at least a portion of time.

11. A wireless network node comprising:
    a processor;
    a wireless network interface, coupled to the processor, to communicate with other nodes of a wireless network;
    a radio for data communications via the wireless network interface; and
    processing logic, executable by the processor, to determine if circumstances have adversely affected synchronization of data communications between wireless network nodes, the circumstances causing a network node to lose time synchronization with other network nodes; transition to an alert mode wherein the radio is activated for a longer period of time relative to a normal operating mode, the processing logic being configured to transition to the alert mode when a network node loses time synchronization with other network nodes; set the radio of the wireless network node to a pre-defined common radio channel while in the alert mode for communicating with other network nodes; send a message to at least one neighbor node; listen for a response from the neighbor node; and establish data communications with the neighbor node upon receiving the response.

12. The wireless network node as claimed in claim 11 being further configured to listen for a response from the neighbor node on a pre-define common channel.

13. The wireless network node as claimed in claim 11 wherein the response from the neighbor node includes a status of the neighbor node.

14. The wireless network node as claimed in claim 11 wherein the response from the neighbor node includes a temporary local data communications schedule.

15. The wireless network node as claimed in claim 11 wherein the message sent to the at least one neighbor node is a jamming message causing the neighbor node to transition to the alert mode.

16. A wireless network comprising:
    a gateway;
    a first wireless network node in data communication with the gateway; and
    a second wireless network node including processing logic to determine if circumstances have adversely affected synchronization of data communications between wireless network nodes, the circumstances causing a network node to lose time synchronization with other network nodes; transition to an alert mode wherein a radio of the second wireless network node is activated for a longer period of time relative to a normal operating mode, the processing logic being configured to transition to the alert mode when a network node loses time synchronization with other network nodes; set the radio of the second wireless network node to a pre-defined common radio channel while in the alert mode for communicating with other network nodes; send a message to the first wireless network node; listen for a response from the first wireless network node; establish data communications with the first wireless network node upon receiving the response; and send data to the gateway via the first wireless network node.

17. The wireless network as claimed in claim 16 wherein the second wireless network node being further configured to listen for a response from the first wireless network node on a pre-defined common channel.

18. The wireless network as claimed in claim 16 wherein the response from the first wireless network node includes a status of the first wireless network node.

19. The wireless network as claimed in claim 16 wherein the response from the first wireless network node includes a temporary local data communications schedule.

20. The wireless network as claimed in claim 16 wherein the message sent to the first wireless network node is a jamming message causing the first wireless network node to transition to the alert mode.

21. The wireless network as claimed in claim 16 wherein all wireless network nodes of the wireless network operate in the alert mode for at least a portion of time.

22. The wireless network as claimed in claim 16 wherein a plurality of wireless network nodes of the wireless network do not operate in the alert mode for at least a portion of time.

23. An article of manufacture comprising a non-transitory machine-readable storage medium having machine executable instructions embedded thereon, which when executed by a machine, cause the machine to:
   determine if circumstances are adversely affecting synchronization of data communications between wireless network nodes, the circumstances causing a network node to lose time synchronization with other network nodes;
   transition to an alert mode wherein a radio of a wireless network node is activated for a longer period of time relative to a normal operating mode, the machine executable instructions being configured to transition to the alert mode when a network node loses time synchronization with other network nodes;
   set the radio of the wireless network node to a pre-defined common radio channel while in the alert mode for communicating with other network nodes;
   send a message to at least one neighbor node;
   listen for a response from the neighbor node; and
   establish data communications with the neighbor node upon receiving the response.

24. The article of manufacture as claimed in claim 23 being further configured to listen for a response from the neighbor node on a pre-defined common channel.

25. A method comprising:
   listening for a message from the neighbor node;
   transitioning to an alert mode wherein a radio of a wireless network node is activated far a longer period of time relative to a normal operating mode, the transitioning to the alert mode being performed when a network node loses time synchronization with other network nodes;
   setting the radio of the wireless network node to a pre-defined common radio channel while in the alert mode for communication with other network nodes;
   sending a message to at least one neighbor node;
   listening for a response from the neighbor node; and
   establishing data communications with the neighbor node upon receiving the response.

26. The method as claimed in claim 25 including listening for a response from the neighbor node on a pre-defined common channel.

27. The method as claimed in claim 25 including marking a data packet with an alert mode indication.

* * * * *